United States Patent
Yoshiura

(10) Patent No.: US 7,529,389 B2
(45) Date of Patent: May 5, 2009

(54) DEVICE FOR VERIFYING INDIVIDUAL, AND METHOD FOR VERIFYING INDIVIDUAL

(75) Inventor: Noriaki Yoshiura, Maebashi (JP)

(73) Assignee: National University Corporation Gunma University, Gunma (JP)

( * ) Notice: Subject to any disclaimer, the term of this patent is extended or adjusted under 35 U.S.C. 154(b) by 668 days.

(21) Appl. No.: 11/192,994

(22) Filed: Jul. 29, 2005

(65) Prior Publication Data

US 2006/0153428 A1 Jul. 13, 2006

(30) Foreign Application Priority Data

Jan. 12, 2005 (JP) ............... 2005-005256

(51) Int. Cl.
*G06K 9/00* (2006.01)
(52) U.S. Cl. ..................... 382/115; 382/124
(58) Field of Classification Search ............. 340/5.52, 340/5.53, 5.82, 5.83, 5.84; 382/115–134, 382/324; 713/186
See application file for complete search history.

(56) References Cited

U.S. PATENT DOCUMENTS

2002/0070844 A1* 6/2002 Davida et al. ............. 340/5.53

FOREIGN PATENT DOCUMENTS

| JP | 08-287259 | 11/1996 |
|----|-----------|---------|
| JP | 2000-011176 | 1/2000 |
| JP | 2001-117876 | 4/2001 |
| JP | 2001-256191 | 9/2001 |
| JP | 2003-030153 | 1/2003 |
| WO | WO-0142938 | 6/2001 |

OTHER PUBLICATIONS

English Abstract of PCT Publication No. WO0142938 published on Jun. 14, 2001 (1 page).
Notice of Reasons For Rejection issued Sep. 16, 2008, by the Japan Patent Office for related Japanese Patent Application No. 2005-005256 (4 pages).
esp@cenet Abstract for Japanese Patent Application Laid Open (JP-A) No. 2003-030153 (1 page).

(Continued)

*Primary Examiner*—Matthew C Bella
*Assistant Examiner*—Gregory F Cunningham
(74) *Attorney, Agent, or Firm*—Osha • Liang LLP

(57) ABSTRACT

For received fingerprint data, there are generated a large number of fingerprint data which are varied by estimating a frequency of appearance of errors due to offset of a finger and inverting predetermined bits. A one-way function is applied to data, which combines a received password and each of the large number of fingerprint data, so as to convert into data of 128 bits for example. Each of the large number of 128-bit data is converted into a character string of 32 characters for example. The large number of character string data are classified by using first two characters thereof, and are registered in an HDD as verification templates corresponding to a user name. By using these verification templates, it is possible to prevent surreptitious use of biological information in a device for verifying an individual by biological information.

17 Claims, 12 Drawing Sheets

OTHER PUBLICATIONS

Patent Abstracts of Japan for Japanese Patent Application No. 2000-011176 published Jan. 14, 2000 (1 page).
Patent Abstracts of Japan for Japanese Patent Application No. 08-287259 published Nov. 1, 1996 (1 page).
Patent Abstracts of Japan for Japanese Patent Application No. 2001-117876 published Apr. 27, 2001 (1 page).
Patent Abstracts of Japan for Japanese Patent Application No. 2001-256191 published Sep. 21, 2001 (1 page).

* cited by examiner

DEVICE FOR VERIFYING INDIVIDUAL, AND METHOD FOR VERIFYING INDIVIDUAL

CROSS-REFERENCE TO RELATED APPLICATION

This application claims priority under 35 USC 119 from Japanese Patent Application No. 2005-5256, the disclosure of which is incorporated by reference herein.

BACKGROUND OF THE INVENTION

1. Field of the Invention

The present invention relates to a device for verifying an individual and a method for verifying an individual, and in particular, to a device for verifying an individual and a method for verifying an individual by biological information.

2. Description of the Related Art

In conventional devices for verifying an individual by biological information, read biological information is registered in advance as data for verification (verification templates), and verification is carried out by comparing the verification templates and biological information which is read (inputted) as verification data at the time of verification. The biological information is analog information, and the biological information which is read at the time of verification is not the same as the verification templates. Therefore, if the differences between the verification templates and the verification data fall within a predetermined range, it is determined that the person who is the object of verification is a legitimate user.

Here, if a person is familiar with the internal specifications of the device for verifying an individual, he/she can guess the verification template by inputting appropriate verification data and utilizing the differences obtained by comparing this verification data with the registered verification templates. Therefore, there is the problem that the verification template will be surreptitiously used.

In order to overcome this problem, there is known a system for verifying an individual in which inputted password (code) data is converted by a one-way function and registered in advance as verification templates, and at the time of verification, the verification templates and data, which is obtained by converting the inputted password data similarly by the one-way function, are compared (see, for example, WO/01/042938).

However, in the system for verifying an individual which is disclosed in aforementioned WO/01/042938, the password (code) data is converted by a one-way function, but biological information is not converted by a one-way function. Therefore, there is the problem that this system cannot handle cases in which there is outflow of the password data.

SUMMARY OF THE INVENTION

The present invention was developed in order to overcome the above-described problems, and provides a device and a method for verifying an individual which, by converting biological information by a one-way function, can prevent surreptitious use of the biological information.

A first aspect of the present invention provides a device for verifying an individual including: a storage section for storing in advance a plurality of verification templates that correspond to a person who is an object of verification, the plurality of verification templates are generated by varying read biological information of the person who is the object of verification into a plurality of information in consideration of errors arising at a time of reading the biological information, and converting the plurality of varied biological information by a one-way function; and a determining section for determining whether a person who is an object of verification is a legitimate user, on the basis of comparison results obtained by the determining section comparing each of the verification templates stored in the storage section and verification data which is generated by biological information of the person who is the object of verification, which is read at a time of verification, being converted by the one-way function.

In accordance with the first aspect, the read biological information is varied into a large number of biological information in consideration of errors arising at the time of reading the biological information. A large number of verification templates, which are generated by converting each of the large number of varied biological information by a one-way function, are stored in advance in the storage section in correspondence with the person who is the object of verification. Each of the verification templates stored in the storage section, and verification data, which is generated by converting read biological information of a person who is an object of verification by the one-way function, are compared by the determining section. On the basis of the results of comparison, the determining section determines whether the person who is the object of verification is a legitimate user.

In the first aspect, by using the verification templates, which are obtained by converting the biological information by the one-way function, conversion from the verification templates to the biological information is made to be impossible, and thus, surreptitious use of the biological information can be prevented. Moreover, a large number of verification templates, which take into consideration errors arising at the time when the biological information is read, are stored. It is thereby possible to realize verification which uses data obtained by converting the biological information by the one-way function.

A second aspect of the present invention provides a device for verifying an individual including: a reading section reading biological information; a storage section for storing in advance a plurality of verification templates that correspond to a person who is an object of verification, the plurality of verification templates are generated by varying biological information of the person who is the object of verification, which is read by the reading section, into a plurality of information in consideration of errors arising at a time of reading the biological information, and converting the plurality of varied biological information by a one-way function; and a determining section for determining whether a person who is an object of verification is a legitimate user, on the basis of comparison results obtained by the determining section comparing each of the verification templates stored in the storage section and verification data which is generated by biological information of the person who is the object of verification, which is read by the reading section at a time of verification, being converted by the one-way function.

The second aspect is a structure in which a reading section is provided in the first aspect.

A third aspect of the present invention provides a device for verifying an individual including: a reading section for reading biological information; an inputting section for inputting identification information; a storage section for storing in advance a plurality of verification templates that correspond to a person who is an object of verification, the plurality of verification templates are generated by varying biological information of the person who is the object of verification, which is read by the reading section, into a plurality of information in consideration of errors arising at a time of reading the biological information, and converting information, in which the identification information is added to each of the plurality of varied biological information, by a one-way function; and a determining section for determining whether a person who is an object of verification is a legitimate user, on the basis of comparison results obtained by the determining section comparing each of the verification templates stored in the storage section and verification data which is generated by information, in which the identification information is added to biological information of the person who is the object of verification which is read by the reading section at a time of verification, being converted by the one-way function.

In the device for verifying an individual relating to the third aspect, the large number of verification templates are generated by converting, by the one-way function, information in which identification information is added to each of the large number of varied biological information. In this way, the identification information is also used in verifying the individual. Therefore, even if the biological information is stolen, if the identification information is changed, verification utilizing the biological information is possible. Further, by changing the identification information, the verification templates also change, and therefore, the security of verification can be improved.

Each of the above-described aspects can be structured such that the storage section is structured by a plurality of storage devices which divide the plurality of verification templates into a plurality of groups and store the verification templates in advance per group, and the determining section is structured by a plurality of determining devices which are provided in correspondence with the plurality of storage devices respectively, and each determining device compares the verification data with each of the plurality of verification templates stored in the corresponding storage device, and, on the basis of results of comparison, determines whether the person who is the object of verification is a legitimate user. By dispersedly storing and comparing the verification templates at a plurality of storage devices, the burden of processing for verifying an individual can be dispersed, and the processing speed can be improved.

A fourth aspect of the present invention provides a method for verifying an individual including: storing in advance a plurality of verification templates that correspond to a person who is an object of verification, the plurality of verification templates are generated by varying read biological information into a plurality of information in consideration of errors arising at a time of reading the biological information, and converting the plurality of varied biological information by a one-way function; and determining whether a person who is an object of verification is a legitimate user, on the basis of comparison results obtained by comparing each of the stored verification templates and verification data which is generated by biological information of the person who is the object of verification, which is read at a time of verification, being converted by the one-way function.

As described above, in accordance with the device for verifying an individual and the method for verifying an individual of the present invention, there is the effect that, by converting biological information by a one-way function and generating verification templates, surreptitious use of the biological information can be prevented. Moreover, there is the effect that, by storing a large number of verification templates which take into consideration errors arising at the time of reading the biological information, it is possible to realize verification which utilizes data obtained by converting the biological information by a one-way function.

BRIEF DESCRIPTION OF THE DRAWINGS

Embodiments of the present invention will be described in detail on the basis of the following figures, wherein.

DETAILED DESCRIPTION OF THE INVENTION

Embodiments of the present invention will be described in detail hereinafter with reference to the drawings.

Figure 1:
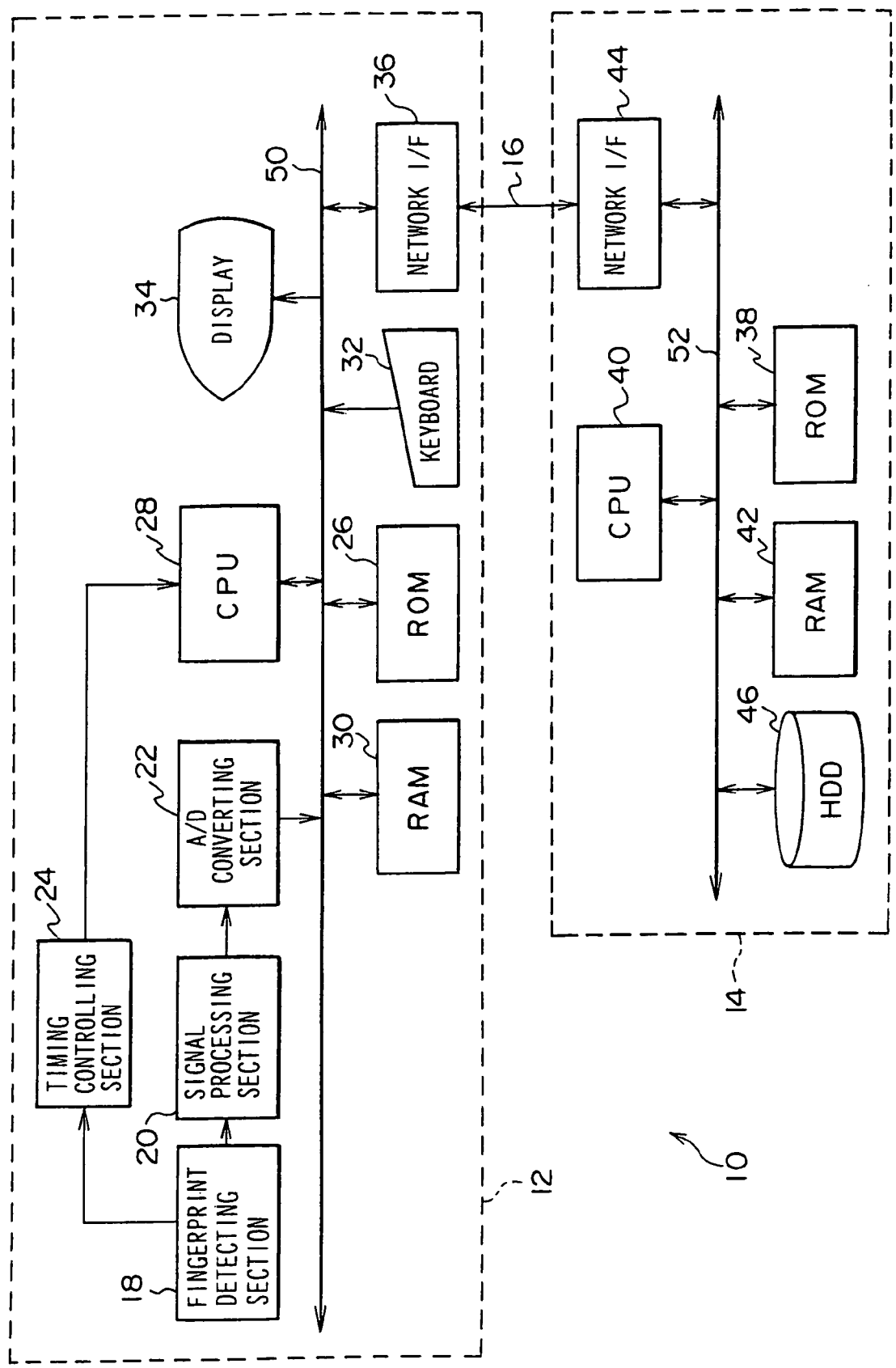
FIG. 1 is a schematic diagram showing the structure of a device for verifying an individual relating to a first embodiment of the present invention.

As shown in FIG. 1, an individual verifying device 10 relating to a first embodiment is structured from a verifying terminal 12 and a verifying server 14 which are connected by a communication line 16. The verifying terminal 12 has: a fingerprint detecting section 18 which picks-up a fingertip by an image pickup element such as a CCD or the like, detects a fingerprint, and outputs image data; a signal processing section 20 which carries out predetermined signal processings, such as noise removal and the like, on image data inputted from the fingerprint detecting section 18; an A/D converting section 22 which converts image data, which is inputted from the signal processing section 20 and is analog data, into a bit string expressed by 0 and 1, and generates fingerprint data which is digital data; and a timing control section 24 which measures the sampling time for detecting the fingerprint data, by using as a reference the time at which the fingerprint detecting section 18 detects the fingerprint.

The verifying terminal 12 has a ROM 26 which stores various types of programs, parameters, and the like; a CPU 28 executing the respective programs; and a RAM 30 which is used as a work area or the like when the CPU 28 executes the various programs. Also provided at the verifying terminal 12 are a keyboard 32 for input of a user name and password; a display 34 which displays various types of information such as character information, image information, and the like; and a network interface 36 which controls the transmission and reception of various types of data.

The A/D converting section 22, the CPU 28, the ROM 26, the RAM 30, the keyboard 32, the display 34, and the network interface 36 are connected to one another via a bus 50. Note that the fingerprint detecting section 18 has a conventionally-known fingerprint detecting function, and detailed explanation relating to fingerprint detection is omitted.

In the same way as the verifying terminal 12, the verifying server 14 has a ROM 38, a CPU 40, a RAM 42, and a network interface 44, and has an HDD 46 which stores a large number of data (verification templates) which are registered in advance for verification. Note that the CPU 40, the ROM 38, the RAM 42, the HDD 46, and the network interface 44 are connected to one another via a bus 52.

The network interface 36 of the verifying terminal 12 and the network interface 44 of the verifying server 14 are connected via the communication line 16.

Next, a verification template generating routine, which generates a verification template of the device for verifying an individual relating to the first embodiment, will be described on the basis of FIG. 2.

At the verifying terminal 12, first, when a person who is an object of verification presses his/her fingertip against a fingerprint sensor (not shown) of the fingerprint detecting section 18, in step 100, the fingerprint is read by the fingerprint detecting section 18, and via the signal processing section 20, is converted into fingerprint data which is digital data by the A/D converting section 22. Next, in step 102, the person who is the object of verification inputs a user name and password by operating the keyboard 32. When it is determined that the user name and password have been inputted, in step 104, the verifying terminal 12 transmits the password, the user name, the fingerprint data, and a register command to the verifying server 14.

Next, in step 106, the verifying server 14 executes verification template generating processing on the basis of the received password, user name, and fingerprint data.

Figure 3:
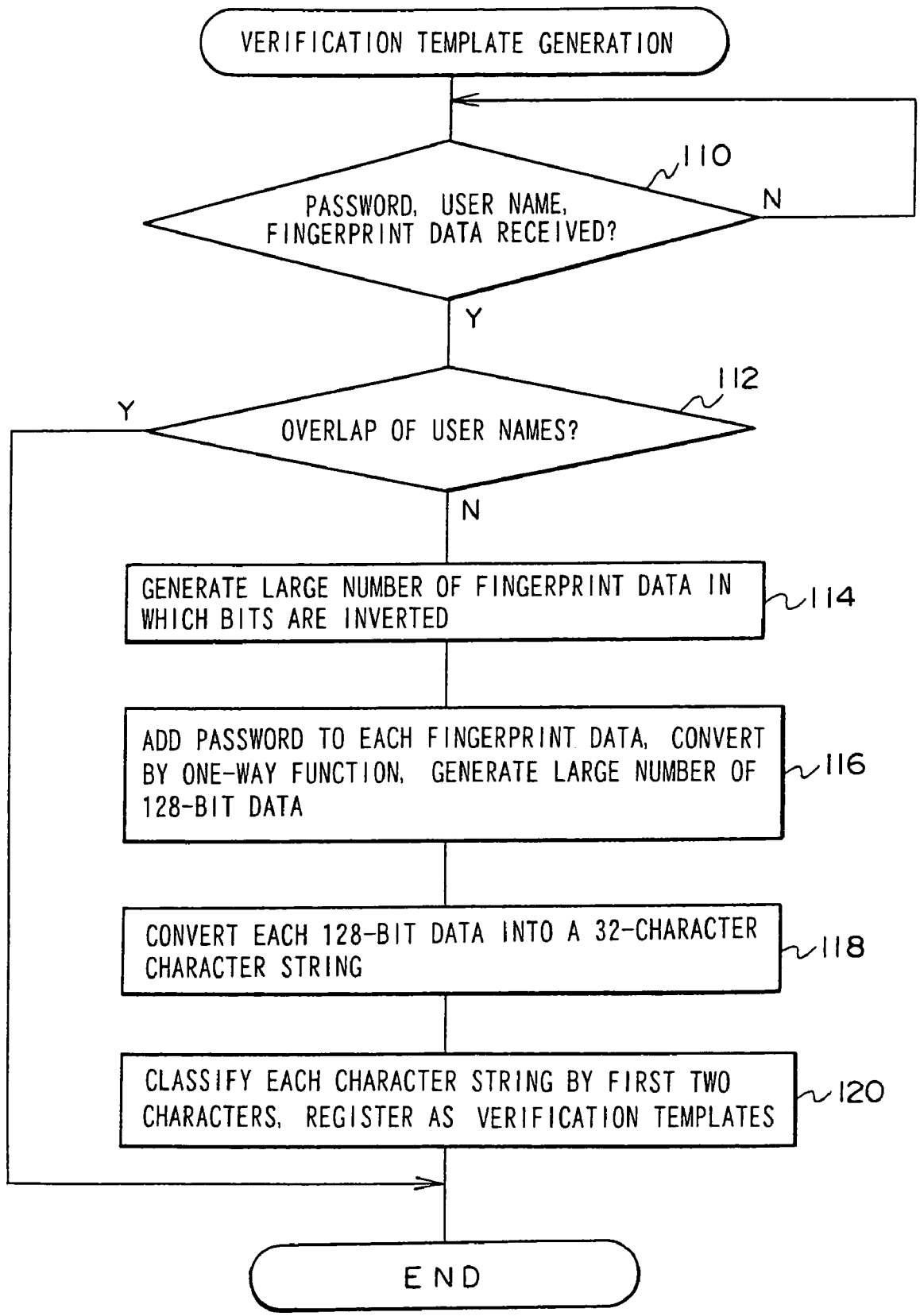
FIG. 3 is a flowchart of verification template generating processing relating to the first embodiment of the present invention.

To explain the verification template generating processing on the basis of FIG. 3, in step 110, it is determined whether or not a password, user name and fingerprint data have been received. If the determination is affirmative, in step 112, it is determined whether or not there is overlapping of the received user name and the user names of the verification templates which are already registered. If the determination is affirmative, there is no need to generate a new verification template, and therefore, the verification template generating processing ends. If the determination is negative, the routine proceeds to step 114.

In step 114, with respect to the received fingerprint data, a large number of fingerprint data, which are varied by inverting predetermined bits, are generated. Note that the bits which are inverted are determined statistically by experimentation. By analyzing a large number of fingerprint data which are obtained in cases in which the finger is offset in various positions, the frequency of appearance of errors due to offset of the finger is inferred, and the bits to be inverted are determined in advance. Due to such experimentation, approximately 1000 types of inverted bit patterns for example are determined in advance.

In subsequent step 116, by applying a one-way function (e.g., MD5 (Message Digest 5)) to the data which combine the received password and the respective fingerprint data of the large number of fingerprint data generated in step 114, each of the data which combines the fingerprint data and the password is converted into data of, for example, 128 bits. In step 118, each of the large number of 128-bit data obtained in step 116 is converted into a character string of, for example, 32 characters, and a large number of character string data are thereby generated.

Then, in step 120, the large number of character string data generated in step 118 are classified by using, for example, the first two characters of the string, and each is registered in the HDD 46 as a verification template corresponding to the user name.

Figure 2:
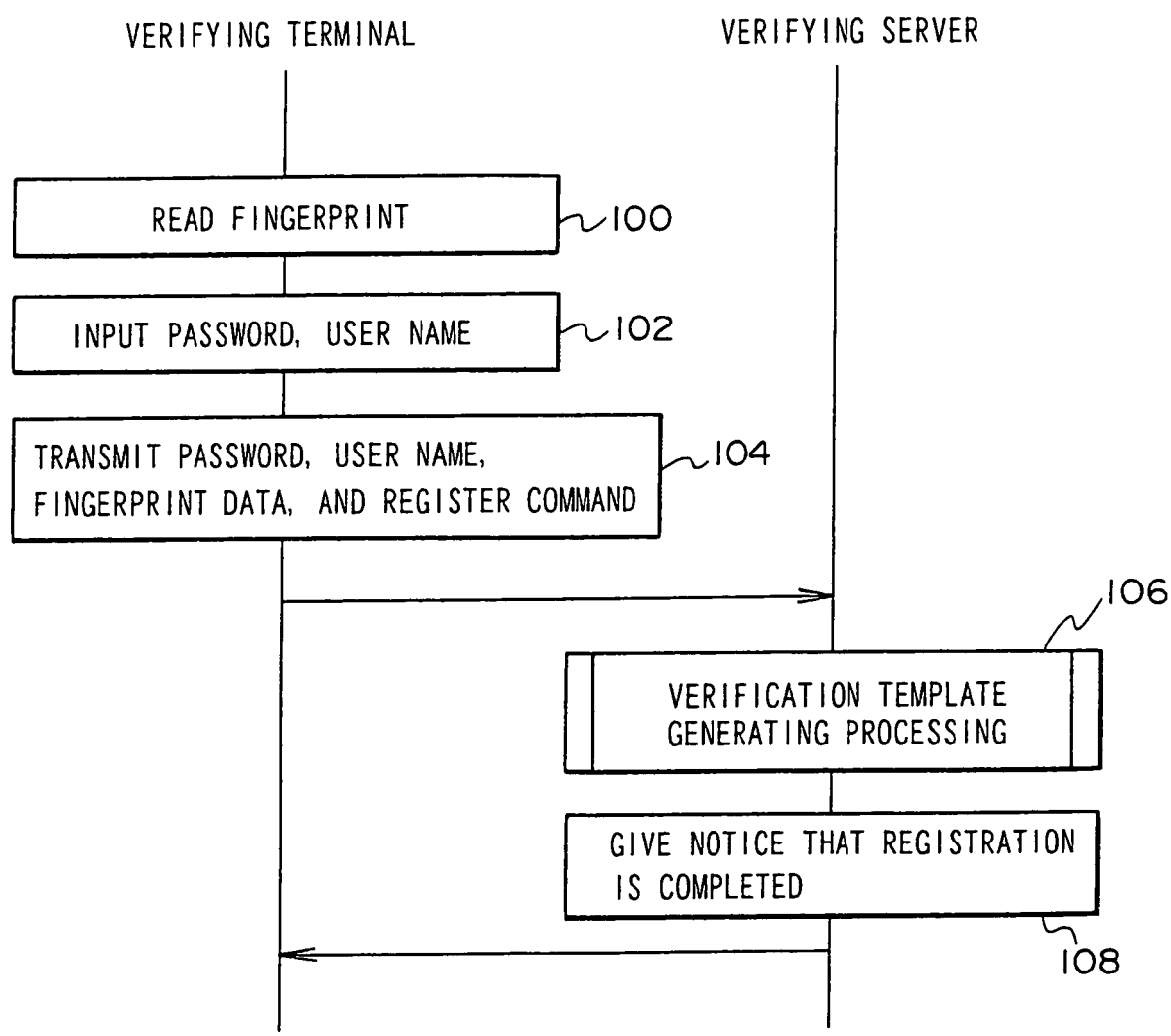
FIG. 2 is a sequence diagram showing contents of processings when generating verification templates of the device for verifying an individual relating to the first embodiment of the present invention.

Next, in step 108 of FIG. 2, a message that registration has been completed is transmitted to the verifying terminal 12, and the verification template generating routine ends. Note that, when the received user name overlaps with a user name which is already stored in the HDD 46, a message that registration has failed is transmitted to the verifying terminal 12. Then, at the verifying terminal 12, a message that registration is completed or that registration has failed is displayed on the display 34 in accordance with the received message.

Next, a verifying routine for verifying a person who is an object of verification will be described on the basis of FIG. 4. Note that the same reference numerals are used for processings which are the same as those described above, and description thereof is omitted.

First, in step 100, the fingerprint of the person who is the object of verification is read by the verifying terminal 12, and fingerprint data is generated. In step 102, the user name and password are inputted by the person who is the object of verification.

When the user name and password are inputted, in subsequent step 140, the data combining the inputted password and the fingerprint data generated in step 100 is converted by the same one-way function as described above, and is converted into data of 128 bits for example. Thereafter, verification data, which is a character string of 32 characters for example, is generated. Then, in step 142, the inputted user name and the verification data generated in step 140 are transmitted to the verifying server 14.

Figure 5:
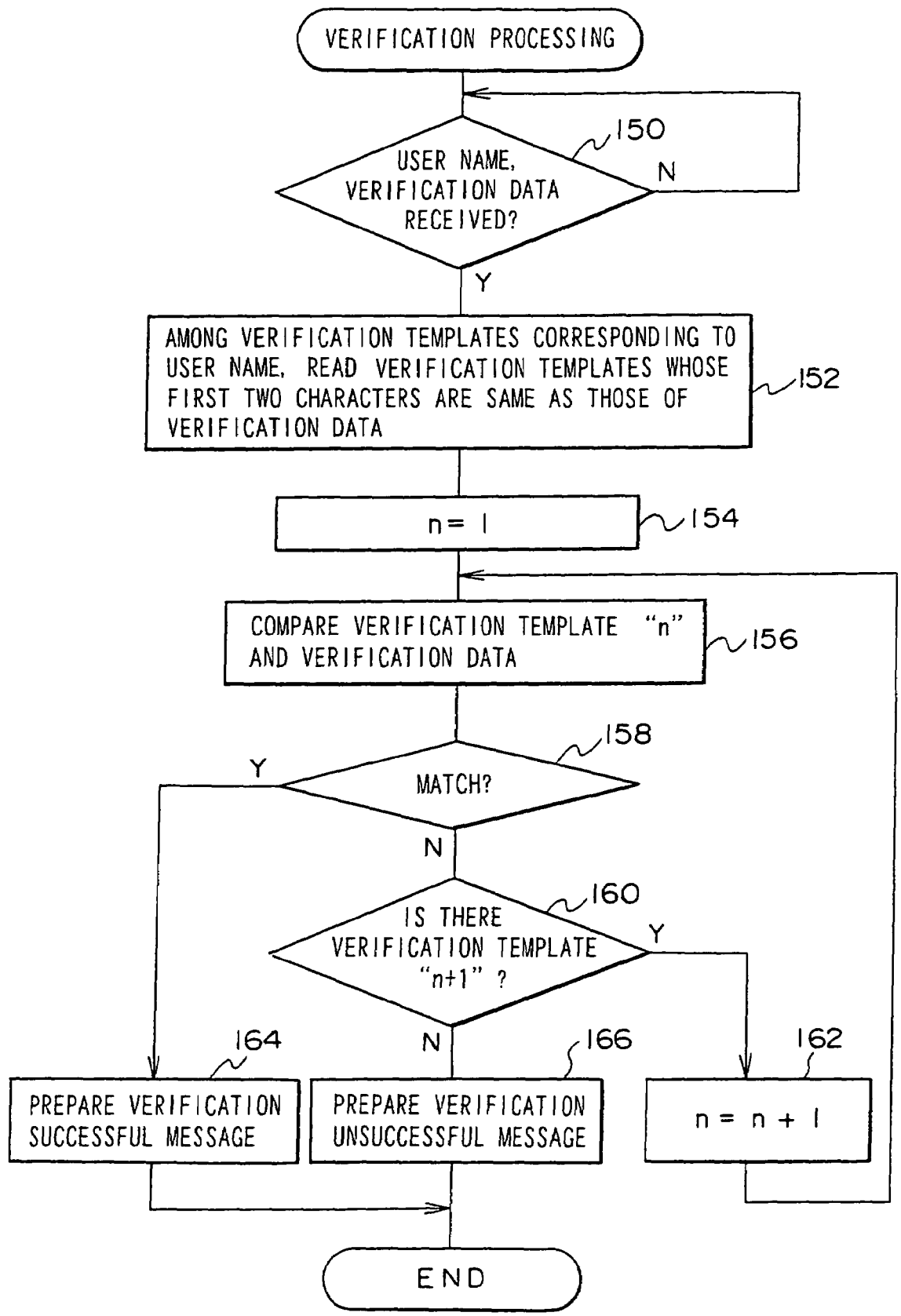
FIG. 5 is a flowchart of verification processing relating to the first embodiment of the present invention.

In next step 144, the verifying server 14 executes verification processing on the basis of the received user name and verification data. The verification processing will be described on the basis of FIG. 5. In step 150, it is determined whether or not a user name and verification data have been received. When the determination is affirmative, the routine proceeds to step 152. In step 152, the verification templates having the same first two characters as the received verification data are read from the HDD 46 from among the verification templates which corresponds to the received user name.

In steps 154 and 156, the first verification template and the verification data are compared. If they match, a message that verification is successful is prepared in step 164, and the verification processing ends. If they do not match, the routine moves on to step 160 where it is determined whether or not there is a second verification template. If this determination is negative, in step 166, a message that verification has been unsuccessful is prepared, and the verification processing ends. If the determination is affirmative, the routine returns to step 156, and the verification data is compared with the second verification template. Steps 156 through 160 are repeated until either a matching verification template is found, or comparison with all of the verification templates is completed.

Figure 4:
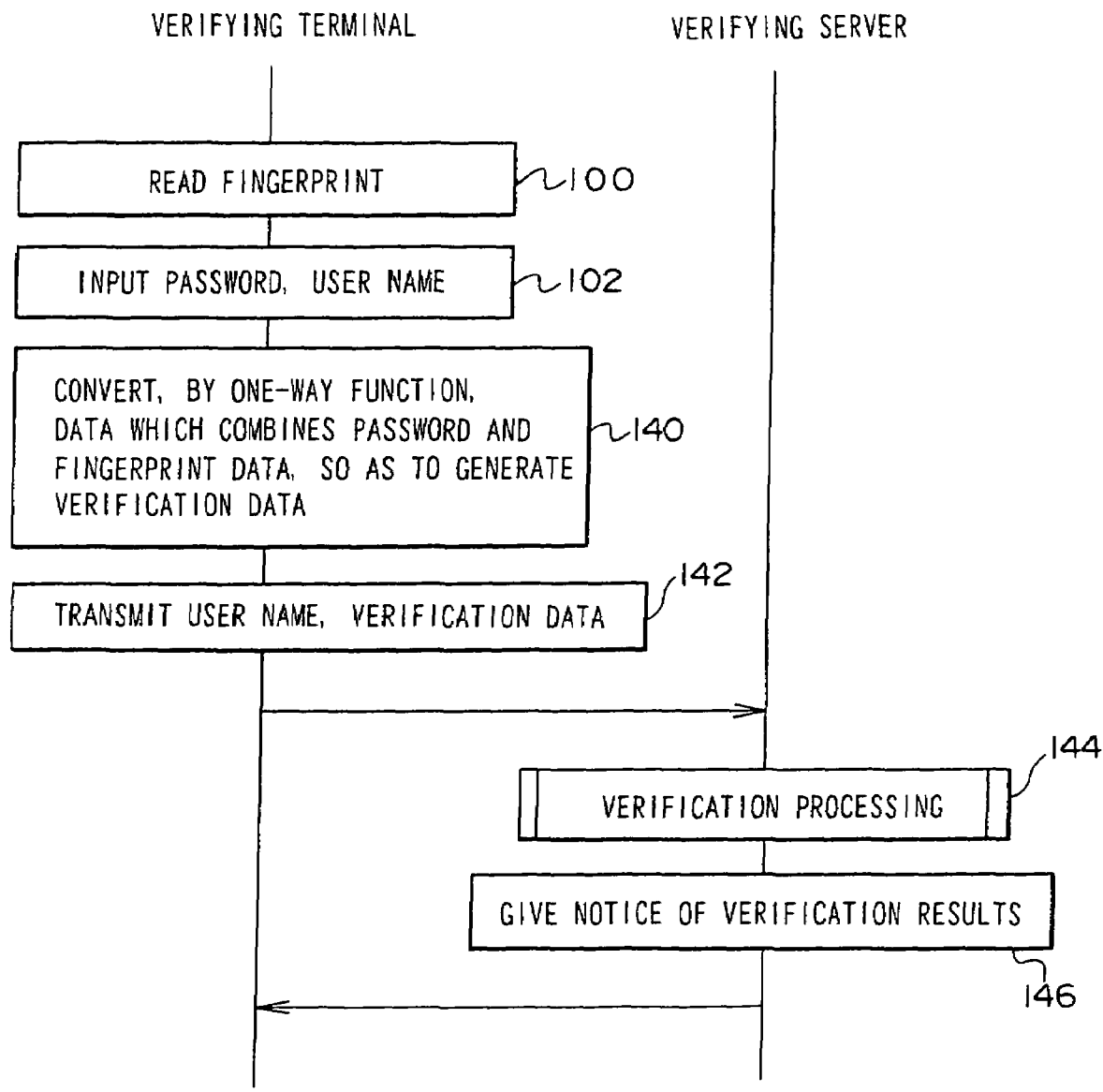
FIG. 4 is a sequence diagram showing contents of processings when verifying a person who is an object of verification at the device for verifying an individual relating to the first embodiment of the present invention.

Then, in step 146 of FIG. 4, the message prepared in step 164 or step 166 is transmitted to the verifying terminal 12, so as to notify the verifying terminal 12 of the results of verification. At the verifying terminal 12, a message that verification is successful or that verification is unsuccessful is displayed on the display 34 in accordance with the received message.

Next, a verification template deleting routine for deleting a verification template will be described on the basis of FIG. 6. Note that the same reference numerals are used for processings which are the same as those described above, and description thereof is omitted.

First, in step 100, the verifying terminal 12 reads the fingerprint of the person who is the object of verification, and generates the fingerprint data. In step 102, the user name and password are inputted by the person who is the object of verification. When the user name and password are inputted, in step 140, verification data is generated. In step 180, the inputted user name, the verification data generated in step 140, and an erase command are transmitted to the verifying server 14.

Figure 7:
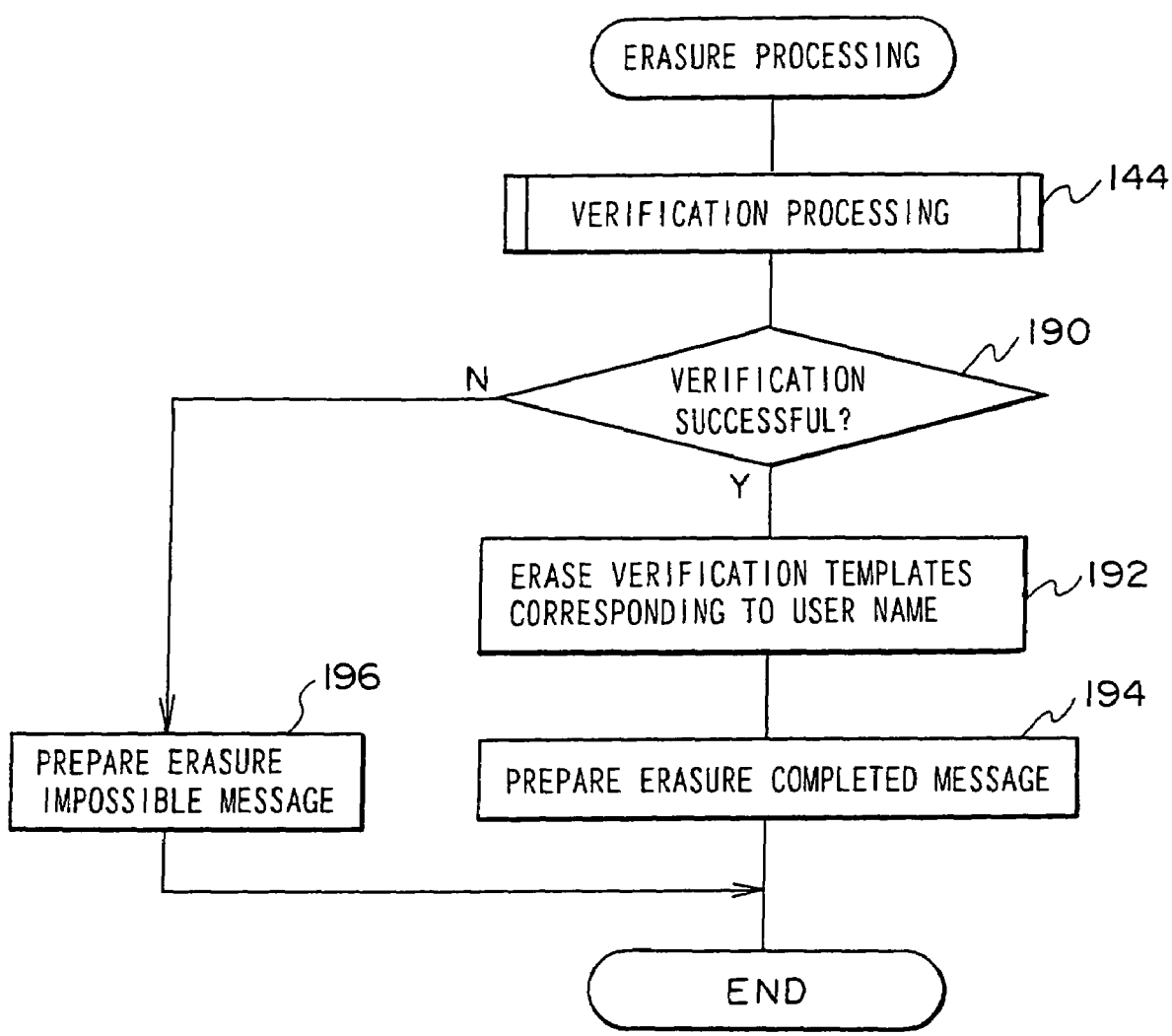
FIG. 7 is a flowchart of erasure processing relating to the first embodiment of the present invention.

In next step 182, the verifying server 14 executes erasure processing. To explain this erasure processing on the basis of FIG. 7, in step 144, the above-described verification processing is carried out. Then, in step 190, it is determined whether or not the verification has succeeded. If the determination is negative, in step 196, a message that erasure cannot be carried out is prepared, and the erasure processing ends. If the determination is affirmative, in step 192, the verification templates corresponding to the user name are erased from the HDD 46, and in step 194, a message that erasure is completed is prepared, and the erasure processing ends.

Figure 6:
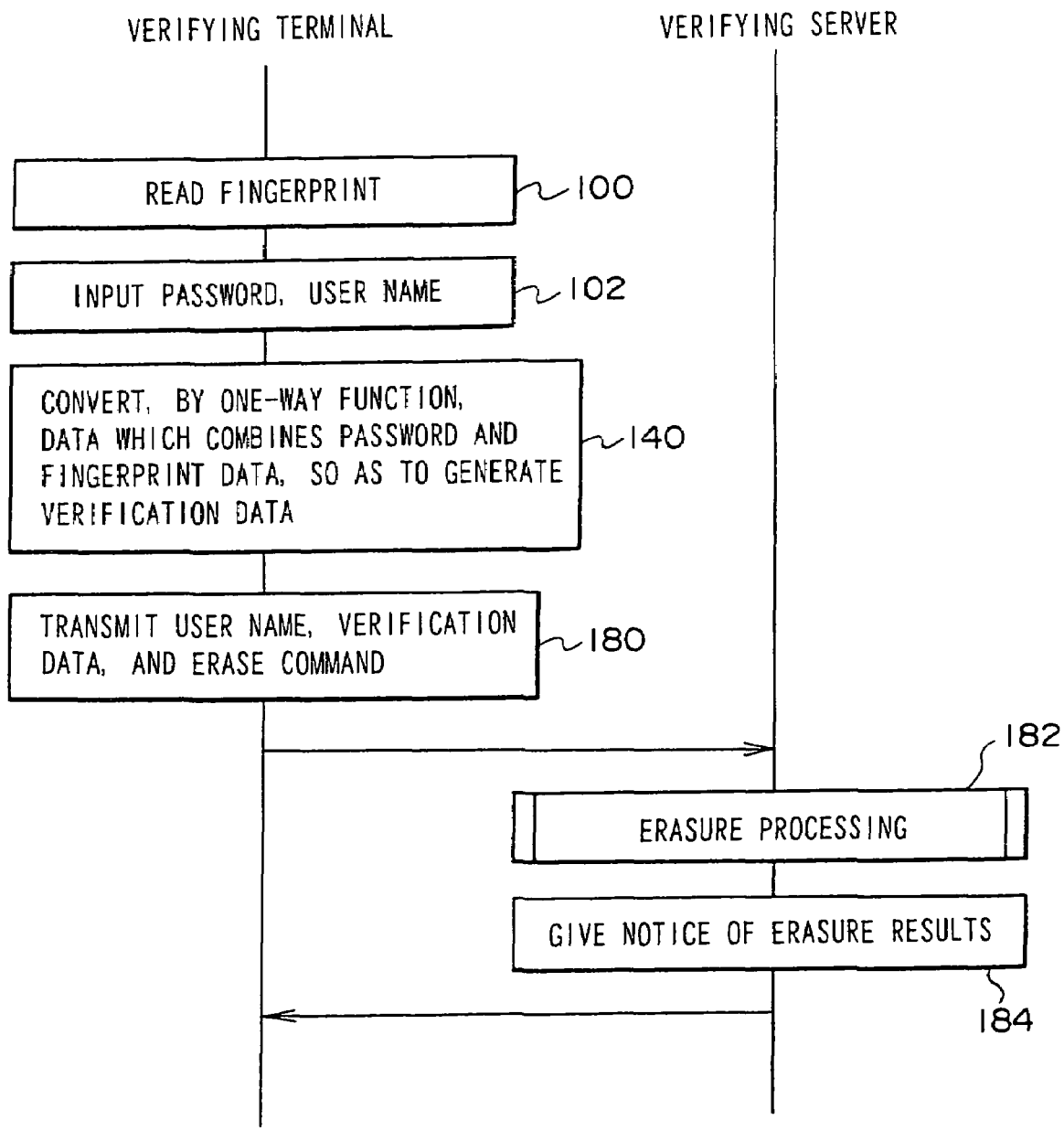
FIG. 6 is a sequence diagram showing contents of processings when deleting verification templates of the device for verifying an individual relating to the first embodiment of the present invention.

Then, in step 184 of FIG. 6, the message prepared in step 194 or 196 is transmitted to the verifying terminal 12, so as to notify the verifying terminal 12 of the results of erasure. At the verifying terminal 12, a message that erasure is completed or that erasure is not possible is displayed on the display 34 in accordance with the received message.

As described above, in accordance with the device for verifying an individual relating to the first embodiment of the present invention, it is not possible to convert from a verification template to biological information, by using a verification template obtained by converting fingerprint data by a one-way function. Thus, because fingerprint data cannot be guessed from the verification template, surreptitious use of the fingerprint data can be prevented. Moreover, even if the verification templates are stolen, it is not possible to guess the fingerprint data, and therefore, the security of verification improves. In addition, by registering a large number of verification templates which take into consideration errors arising at the time of reading the fingerprint data, it is possible to realize verification which uses data obtained by converting fingerprint data by a one-way function. Further, by also using a password in the verification, even if the fingerprint data is stolen, verification using the fingerprint data is possible if the password is changed. Also, because the verification template as well is changed by changing the password, the security of verification can be improved even more.

Explanation has been given of a case in which, when a large number of character string data are registered as the verification templates, registration is carried out by classifying the data by using the first two characters of the character string data. However, the present invention is not limited to this example. The data can be registered by being classified by using the first three characters or the first four characters of the character string data. Or, it is possible to not classify by using the leading characters, and to register the large number of character string data as verification templates as is without being classified.

Next, a second embodiment will be described on the basis of the drawings. Note that structural portions which are the same as those of the first embodiment are denoted by the same reference numerals and description thereof is omitted.

Figure 8:
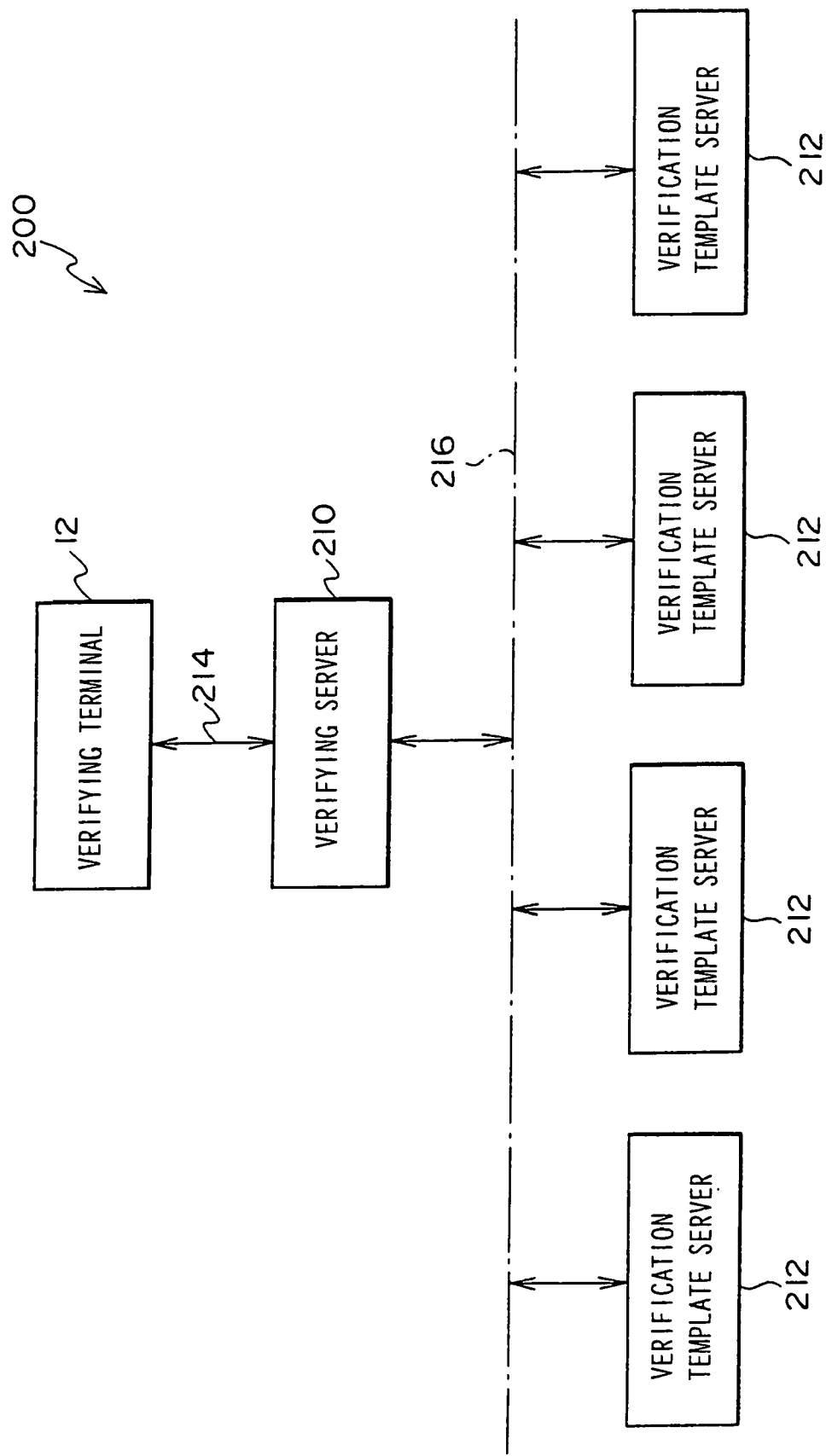
FIG. 8 is a schematic diagram showing the structure of a device for verifying an individual relating to a second embodiment of the present invention.

As shown in FIG. 8, an individual verifying device 200 relating to the second embodiment is structured from the verifying terminal 12, a verifying server 210 executing verification processing in a dispersed manner, and a plurality of verification template servers 212 which actually execute the verification processing. The verifying server 210 and the verification template servers 212 have the same structures as the verifying server 14 relating to the above-described first embodiment, and have a CPU, an HDD, a RAM, a ROM, and a network interface. The verification templates are stored dispersedly in the HDDs of the plural verification template servers 212. A user list, which is a list of names of users whose verification templates are stored in the verification template servers 212, is stored in the HDD of the verifying server 210.

The verifying terminal 12 and the verifying server 210 are connected together via a communication line 214. The verifying server 210 and the respective verification template servers 212 are connected together via a communication line 216.

Next, a verification template generating routine, which generates the verification template of the device for verifying an individual relating to the second embodiment, will be described on the basis of FIG. 9. Note that processings of the same contents as in the first embodiment are denoted by the same reference numerals, and detailed description thereof is omitted.

First, in step 100, the fingerprint of a person who is an object of verification is read by the verifying terminal 12, and fingerprint data is generated. In step 102, when the user name and password are inputted by the person who is the object of verification, in step 104, the verifying terminal 12 transmits the password, the user name, the fingerprint data, and a register command to the verifying server 210.

Next, at the verifying server 210, in step 300, it is confirmed whether or not the received user name is registered in the user list stored in the HDD. Overlapping of the user name is confirmed, and if the user name overlaps, the verification template generating routine ends. If it is confirmed that the user name does not overlap, the routine moves on to step 302.

In step 302, the predetermined types of patterns which invert the bits of the fingerprint data (i.e., the verification template generation ranges) are divided in accordance with the number of the verification template servers 212. The divisional verification template generation ranges are assigned to the respective verification template servers 212, and a verification template generation range instruction is generated for each of the verification template servers 212. Then, in step 304, the received password, user name, fingerprint data, and verification template generation range instruction are transmitted to the respective verification template servers 212.

Figure 10:
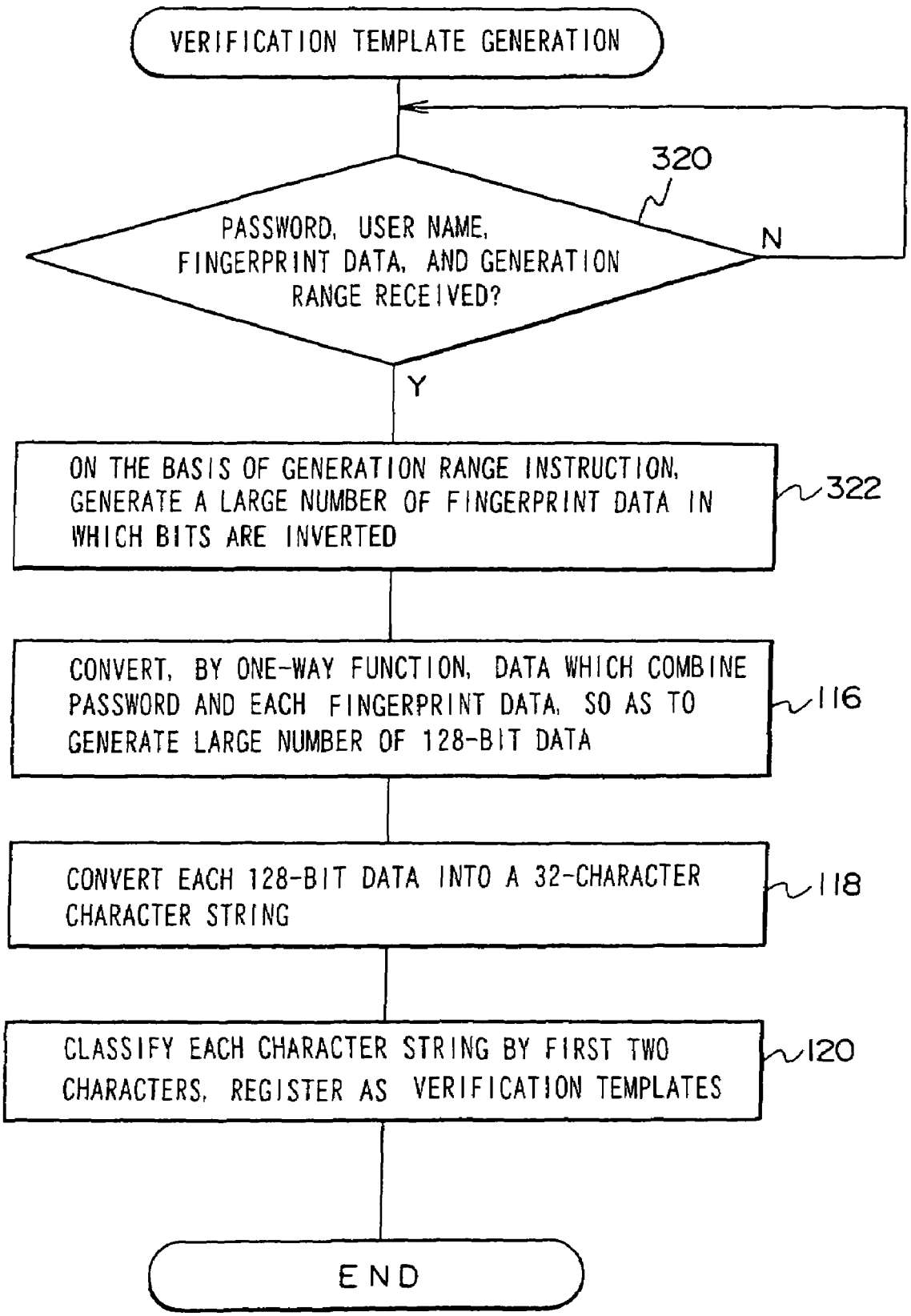
FIG. 10 is a flowchart of verification template generating processing relating to the second embodiment of the present invention.

At each of the verification template servers 212, template generation processing is carried out in step 306. In this template generation processing, in step 320 of FIG. 10, it is determined whether or not the password, user name, fingerprint data, and assigned verification template generation range instruction have been received. If the determination is affirmative, the routine moves on to step 322.

In step 322, on the basis of the plurality of bit patterns of the received generation range, the bits of the received fingerprint data are inverted, and a large number of fingerprint data are generated. Then, in step 116, in the same way as in the first embodiment, a one-way function is applied to the data which combine the received password and each of the large number of generated fingerprint data, and the combined data are thereby converted into 128-bit data for example. In step 118, each of the large number of 128-bit data is converted into a character string of 32 characters for example, such that a large number of character string data are generated. Then, in step 120, the large number of character string data are classified by using the leading two characters of the string, and each is registered in the HDD 46 as a verification template corresponding to the user name.

Figure 9:
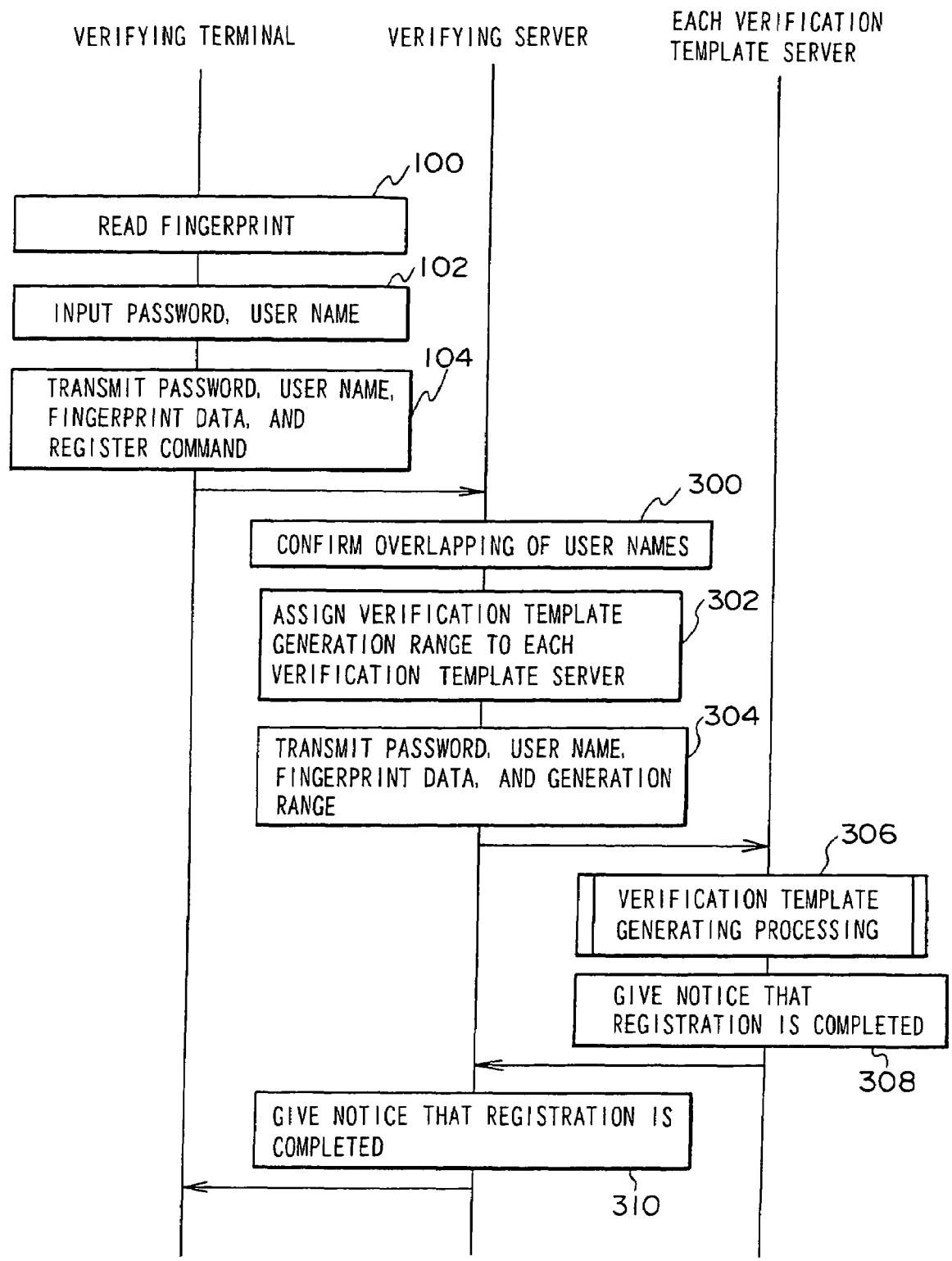
FIG. 9 is a sequence diagram showing contents of processings when generating verification templates of the device for verifying an individual relating to the second embodiment of the present invention.

Next, in step 308 of FIG. 9, a message that registration has been completed is transmitted to the verifying server 210. In step 310, the verifying server transmits a message that registration has been completed to the verifying terminal 12, and the verification template generating routine ends.

Figure 11:
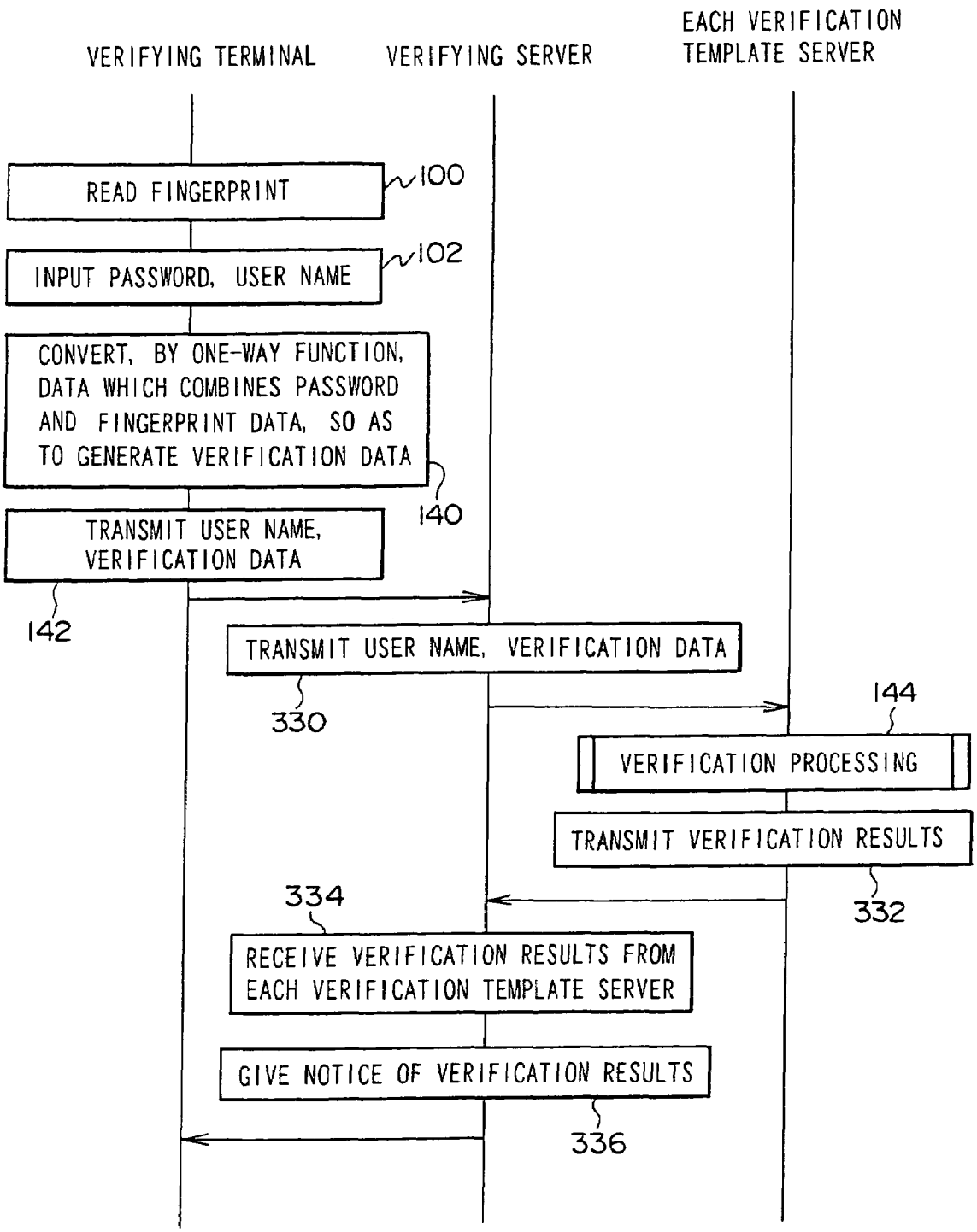
FIG. 11 is a sequence diagram showing contents of processings when verifying a person who is an object of verification at the device for verifying an individual relating to the second embodiment of the present invention.

Next, a verification routine for verifying a person who is an object of verification will be described on the basis of FIG. 11.

First, in step 100, the fingerprint of a person who is an object of verification is read by the verifying terminal 12, and fingerprint data is generated. In step 102, the user name and password are inputted by the person who is the object of verification. In subsequent step 140, data combining the fingerprint data and the password are converted by a one-way function so as to generate verification data. In step 142, the user name and the verification data are transmitted to the verifying server 210.

Next, in step 330, the verifying server 210 transmits the received user name and verification data to the respective verification template servers 212. Then, at each of the verification template servers 212, verification processing is carried out in step 144. In step 332, the verification template servers 212 transmit the results of verification to the verifying server 210.

In subsequent step 334, the verifying server 210 receives the verification results from the respective verification template servers 212. When the verifying server 210 receives a message from one of the verification template servers 212 that verification has been successful, the verifying server 210 prepares a message that verification has been successful. If the verifying server 210 receives message that verification is unsuccessful from all of the verification template servers 212, the verifying server 210 prepares a message that verification has been unsuccessful. Then, in step 336, the verifying server 210 transmits the prepared message to the verifying terminal 12, so as to inform the verifying terminal 12 of the results of verification.

Figure 12:
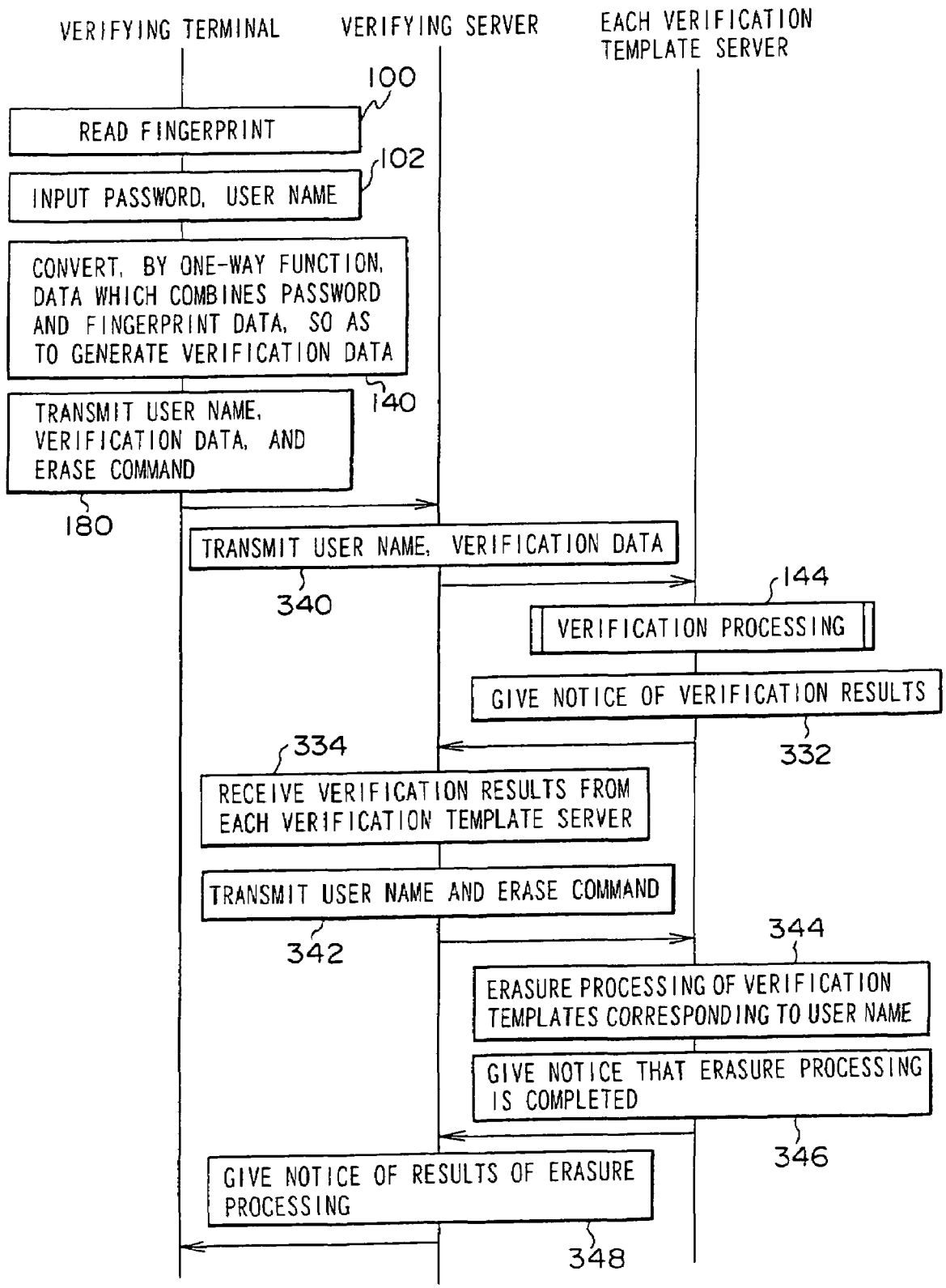
FIG. 12 is a sequence diagram showing contents of processings when deleting verification templates of the device for verifying an individual relating to the second embodiment of the present invention.

Next, a verification template deleting routine, which deletes a verification template, will be described on the basis of FIG. 12. First, in step 100, by the verifying terminal 12, the fingerprint of a person who is an object of verification is read, and fingerprint data is generated. In step 102, when the user name and password are inputted, in step 140, the verifying terminal 12 generates verification data. In step 180, the verifying terminal 12 transmits the user name, verification data, and an erase command to the verifying server 210.

In step 340, the verifying server 210 transmits the user name and verification data to each of the verification template servers 212. In step 144, the respective template servers carry out verification processing, and in step 332, inform the verifying server 210 of the results of verification.

In step 334, the verifying server 210 receives the verification results from the respective verification template servers 212. If the verifying server 210 receives a message that verification has been successful, in step 342, the verifying server 210 sends the user name and an erase command to each of the verification template servers 212. Note that, when the verifying server 210 receives messages that verification is unsuccessful from all of the verification template servers 212, the verifying server 210 prepares a message that erasure is not possible, and the routine moves on to step 348.

Then, in step 344, each of the verification template servers 212 erases, from the HDD, the verification templates corresponding to the received user name. In step 346, the verification template servers 212 transmit to the verifying server 210 messages that erasure is completed. In step 348, the verifying server 210 sends a message that erasure is completed or a message that erasure was unsuccessful to the verifying terminal 12, so as to inform the verifying terminal 12 of the results of erasure. In accordance with the received message, the verifying terminal 12 displays, on the display 34, a message that erasure is completed or that erasure is not possible.

As described above, in accordance with the device for verifying an individual relating to the second embodiment of the present invention, the verification templates are stored in a dispersed manner among the plurality of verification template servers, and whether the person who is the object of verification is a legitimate user is judged in a dispersed manner at the plural verification template servers. In this way, the burden of processing for verifying an individual is dispersed among the plurality of verification template servers, and the processing speed can be improved.

Cases in which fingerprint data is detected as image data have been described as examples, but the present invention is not limited to these examples. It is possible to, without generating fingerprint data by reading a fingerprint in detail, extract the characteristic portions of a fingerprint and generate abstracted fingerprint data.

Cases in which fingerprint data is used as the biological information have been described as examples, but the present invention is not limited to these examples. For example, iris data, facial characteristic data, or the like may be used.

What is claimed is:

1. A device for verifying an individual comprising:
    a storage section storing a plurality of verification templates that correspond to a person who is an object of verification, the plurality of verification templates are generated by varying read biological information of the person who is the object of verification into a plurality of information in consideration of errors arising at a time of reading the biological information, and converting the plurality of varied biological information by a one-way function; and
    a determining section for determining whether a person who is an object of verification is a legitimate user, on the basis of comparison results obtained by the determining section comparing each of the verification templates stored in the storage section and verification data which is generated by biological information of the person who is the object of verification, which is read at a time of verification, being converted by the one-way function.

2. The device for verifying an individual of claim 1, further comprising a reading section for reading the biological information.

3. The device for verifying an individual of claim 1, further comprising an inputting section for input of identification information of a person who is an object of verification.

4. The device for verifying an individual of claim 3, wherein the plurality of verification templates are generated by converting, by the one-way function, information in which the identification information is added to each of the plurality of varied biological information.

5. The device for verifying an individual of claim 3, wherein the verification data is generated by converting, by the one-way function, information in which the identification information is added to the biological information of the person who is the object of verification which is read at the time of verification.

6. The device for verifying an individual of claim 1, wherein:
the storage section is structured by a plurality of storage devices which divide the plurality of verification templates into a plurality of groups and store the verification templates in advance per group, and
the determining section is structured by a plurality of determining devices which are provided in correspondence with the plurality of storage devices respectively, and each determining device compares the verification data with each of the plurality of verification templates stored in the corresponding storage device, and, on the basis of results of comparison, determines whether the person who is the object of verification is a legitimate user.

7. The device for verifying an individual of claim 1, wherein the biological information is fingerprint information.

8. A device for verifying an individual comprising:
a reading section reading biological information;
a storage section storing a plurality of verification templates that correspond to a person who is an object of verification, the plurality of verification templates are generated by varying biological information of the person who is the object of verification, which is read by the reading section, into a plurality of information in consideration of errors arising at a time of reading the biological information, and converting the plurality of varied biological information by a one-way function; and
a determining section for determining whether a person who is an object of verification is a legitimate user, on the basis of comparison results obtained by the determining section comparing each of the verification templates stored in the storage section and verification data which is generated by biological information of the person who is the object of verification, which is read by the reading section at a time of verification, being converted by the one-way function.

9. The device for verifying an individual of claim 8, wherein the plurality of verification templates are generated by converting, by the one-way function, information in which identification information is added to each of the plurality of varied biological information.

10. The device for verifying an individual of claim 8, wherein:
the storage section is structured by a plurality of storage devices which divide the plurality of verification templates into a plurality of groups and store the verification templates in advance per group; and
the determining section is structured by a plurality of determining devices which are provided in correspondence with the plurality of storage devices respectively, and each determining device compares the verification data with each of the plurality of verification templates stored in the corresponding storage device, and, on the basis of results of comparison, determines whether the person who is the object of verification is a legitimate user.

11. A device for verifying an individual comprising:
a reading section for reading biological information;
an inputting section for inputting identification information;
a storage section storing a plurality of verification templates that correspond to a person who is an object of verification, the plurality of verification templates are generated by varying biological information of the person who is the object of verification, which is read by the reading section, into a plurality of information in consideration of errors arising at a time of reading the biological information, and convening information, in which the identification information is added to each of the plurality of varied biological information, by a one-way function; and
a determining section for determining whether a person who is an object of verification is a legitimate user, on the basis of comparison results obtained by the determining section comparing each of the verification templates stored in the storage section and verification data which is generated by biological information, in which the identification information is added to biological information of the person who is the object of verification which is read by the reading section at a time of verification, being converted by the one-way function.

12. The device for verifying an individual of claim 11, wherein:
the storage section is structured by a plurality of storage devices which divide the plurality of verification templates into a plurality of groups and store the verification templates in advance per group; and
the determining section is structured by a plurality of determining devices which are provided in correspondence with the plurality of storage devices respectively, and each determining device compares the verification data with each of the plurality of verification templates stored in the corresponding storage device, and, on the basis of results of comparison, determines whether the person who is the object of verification is a legitimate user.

13. A method for verifying an individual comprising:
storing a plurality of verification templates that correspond to a person who is an object of verification, the plurality of verification templates are generated by varying read biological information into a plurality of information in consideration of errors arising at a time of reading the biological information, and converting the plurality of varied biological information by a one-way function; and
determining whether a person who is an object of verification is a legitimate user, on the basis of comparison results obtained by comparing each of the stored verification templates and verification data which is generated by biological information of the person who is the object of verification, which is read at a time of verification, being convened by the one-way function.

14. The method of verifying an individual of claim 13, further comprising inputting identification information of a person who is an object of verification.

15. The method for verifying an individual of claim 14, wherein the plurality of verification templates are generated by converting, by the one-way function, information in which the inputted identification information is added to each of the plurality of varied biological information.

16. The method for verifying an individual of claim 14, wherein the verification data is generated by converting, by the one-way function, information in which the inputted identification information is added to the biological information of the person who is the object of verification which is read at the time of verification.

17. The method for verifying an individual of claim 13, wherein the biological information is fingerprint information.

* * * * *